L. SKILBRED.
ARTICLE CARRIER SUPPORT FOR AUTOMOBILES.
APPLICATION FILED AUG. 6, 1919.
1,344,729.
Patented June 29, 1920.
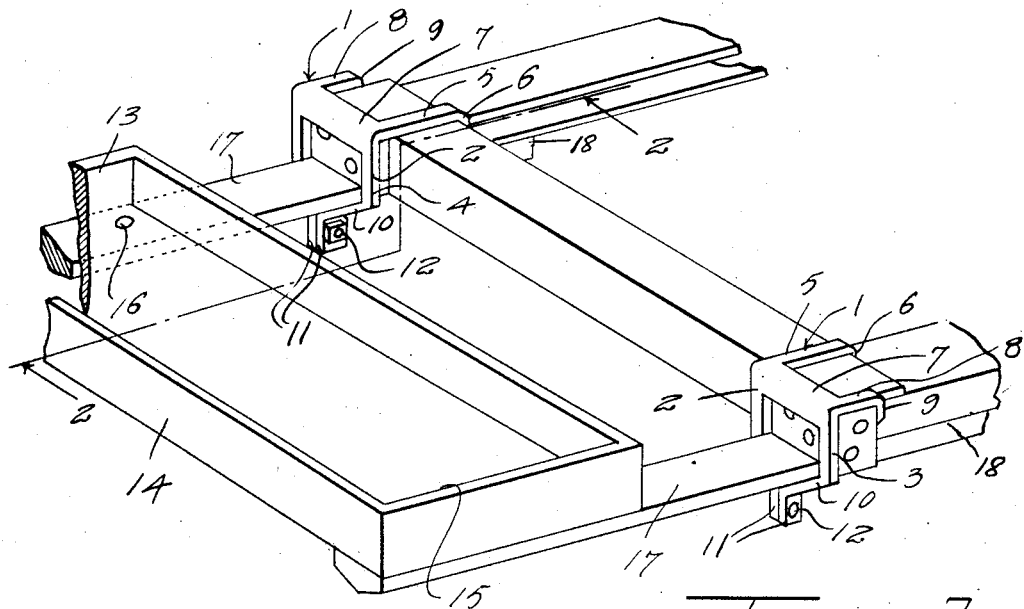
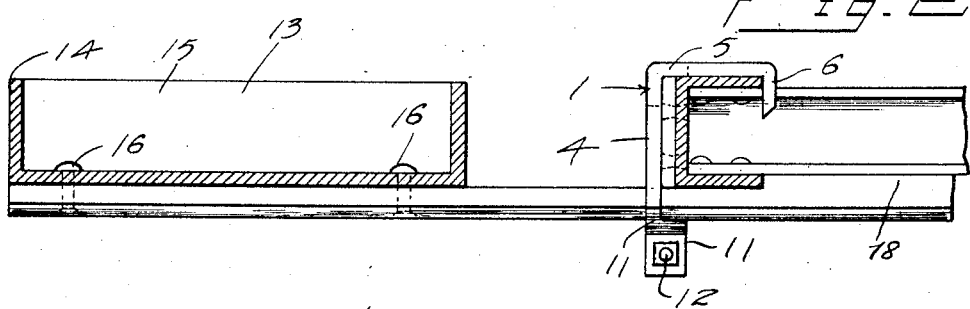
Inventor
L. Skilbred.
By Watson E. Coleman
Attorney

UNITED STATES PATENT OFFICE.

LARS SKILBRED, OF DORCHESTER, WISCONSIN.

ARTICLE-CARRIER SUPPORT FOR AUTOMOBILES.

1,344,729.  Specification of Letters Patent.  Patented June 29, 1920.

Application filed August 6, 1919. Serial No. 315,761.

*To all whom it may concern:*

Be it known that I, LARS SKILBRED, a citizen of the United States, residing at Dorchester, in the county of Clark and State of Wisconsin, have invented certain new and useful Improvements in Article-Carrier Supports for Automobiles, of which the following is a specification, reference being had to the accompanying drawings.

This invention relates to a carrier for articles, and particularly to an improved support therefor, especially adapted for use in connection with the rear part of the frame of an automobile, preferably of the "Ford" type, and one of the objects of the invention is the provision of a carrier, and especially a support, which is efficient, simple and practical in construction and may be manufactured for a relatively low cost and sold reasonably to the trade.

The invention further aims to provide supporting means for the carrier, comprising hangers provided with parts engaging the rear cross beam of the chassis adjacent the sides thereof, said hangers having openings in their lower portions, through which arms of a carrier extend so as to engage under the sides of the chassis to firmly support the carrier in such wise as to prevent vibrations.

A further object of the invention, is the provision of hangers carried by the rear transverse beam of the chassis or frame, having yieldable arms, which may be drawn together, and between which arms of the carrier may extend, the lower parts of the arms of the hanger having bent portions to be engaged by the arms of the carrier, which engage under the sides of the chassis, thereby holding the carrier firmly in position, the lower portions of the arms of the hangers having securing means to hold the arms together.

A further object of the invention is the provision of means for holding the hangers on the frame or chassis of the automobile.

A further object of the invention is the provision of lugs or stops on the arms of the carrier to engage a portion of the rear part of the chassis or frame, to prevent backward movement of the carrier and the arms thereof.

While the design and construction at present illustrated and set forth are deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of a portion of the chassis or frame of an automobile particularly the frame or chassis of a Ford type of automobile, showing the supporting hangers applied, and the carrier arms engaging therewith.

Fig. 2 is a sectional view on line 2—2 of Fig. 1, showing the connections between the hanger and the frame or chassis.

Fig. 3 is an enlarged detail perspective view of one of the hangers, and one of the carrier arms, showing the arm in position ready to enter between the arms of the hanger.

Referring more especially to the drawings, 1 designates a pair of hangers, which are connected to the chassis or frame. Each hanger comprises the opposing side pieces 2 and 3, which are angular, and the side piece 2 comprises a vertical part 4 having at its upper portion a horizontal arm 5, the forward end of which has a depending lug 6, which overhangs the forward edge of the rear transverse part of the chassis or frame, thereby assisting in holding the hanger on the frame. The other side piece 3 (which is connected to the side piece 2 by means of the transverse part 7) has a forwardly extending upper arm 8, which engages the side of the chassis or frame, thereby further assisting in holding the hanger on the frame. This forward horizontal arm 8 also has a lug 9 depending therefrom to engage a part of the frame to hold the hanger in position. The arm 8 is shorter than the arm 5, so as to engage the side or corner bracket of the frame. The lower part of the side pieces 2 and 3 are bent inwardly toward each other and form the supports 10, which incline slightly downwardly and terminate in ears 11, through which the bolts 12 pass. By tightening the nuts of the bolts 12, the ears may be drawn toward each other, thereby also drawing the side pieces toward one another.

A suitable carrier 13 is provided, and which may be constructed of any suitable material and may be any configuration, shape or length. In the present instance, the carrier is rectangular and comprises side and end flanges 14 and 15, though not necessarily. Secured to the carrier as at 16 are supporting arms 17. The upper faces of the arms 17 are flat and are designed to engage the under edge of the end of the frame or the chassis. The under faces of the arms 17 are provided with inclined parts as shown, which extend downwardly toward each other and conform to the inclined portions or supports 10 of the side pieces of the hanger, so as to rigidly support the carrier. The side pieces of the hangers are drawn closely in contact with the opposite longitudinal edges of the arms 17, thereby preventing displacement of the arms. The upper faces of the arms 17 are supplied with lugs or enlargements 18, which engage the depending flange of the frame or chassis, that is on its inner portion, thereby preventing rearward displacement of the carrier arms 17. By means of these enlargements or lugs 18, and the frictional engagement of the side pieces 2 and 3 of the hangers with the opposite longitudinal edges of the arms 17, the carrier arms are held securely in position, and in such wise as to prevent the vibration of the frame from displacing said arms. When the arms 17 are engaged with the hangers as shown in Fig. 1, their forward ends engage under the sides of the chassis or frame, thereby holding the carrier in a horizontal position.

The cross pieces 7 are constructed angular, so as to fit the corners of the rear of the automobile frame or chassis, thereby bracing the bracket, and insuring greater rigidity. The cross pieces 7 engage on the top as much as they do on the rear of the chassis or frame of the automobile. Furthermore, the carrier arms may be made of any suitable material, preferably angle steel, canal steel or tubing. Furthermore the arms 17 may be constructed in any shape, preferably straight, as shown, though not necessarily, for it is obvious that the arms may assume other shapes to accommodate the various needs. Moreover, the carrier arms may be constructed of any suitable material, or made smaller or larger, and also the minor details of construction may be varied, without departing from the spirit of the invention.

The invention having been set forth, what is claimed as new and useful is:

1. The combination with a hanger being angular and having upper horizontal arms provided with depending lugs to engage the forward edge of the rear beam of the chassis, said hanger having depending parts detachably connected in opposed relations adjacent the rear face of said rear beam, of a carrier having an arm engaging between said depending parts and under the frame, thereby supporting the carrier.

2. The combination with a pair of hangers, each having an opening and provided with means overhanging the rear transverse part of an automobile chassis, of a carrier having arms engaging through the openings of the hangers and contacting under the sides of the chassis, the upper faces of the arms of the carrier having means engaging on the inner part of the chassis or frame to prevent rearward movement of the carrier arms.

3. The combination with the chassis of an automobile, of a pair of hangers having means to support them on the rear of the chassis, said hangers having opposing depending spaced parts having their lower ends attached together respectively, thereby causing openings to be formed adjacent the rear beams of the chassis and in alinement with the sides of the chassis, a carrier having forwardly extending arms engaging through the openings of the hangers and contacting with the under edges of the sides of the frame, thereby clamping the arms in position.

4. The combination with a pair of hangers provided with means to support them on the rear of the chassis, said hangers having depending parts which are spaced and are parallel, of a carrier having forwardly extending arms engaging between the depending parts of the hanger and contacting with the under edges of the sides of the chassis, means for clamping the lower ends of said parts under the arms, thereby supporting the arms and the carrier, the upper faces of the arms having means engaging on the inner parts of the rear of the chassis to prevent rearward movement of the arms of the carrier.

5. As an article of manufacture, a hanger being angular and provided with upper horizontal arms having depending lugs, said hanger having depending elongated parts having their lower portions bent laterally toward each other and provided with terminals adapted to be secured together, thereby forming an opening in the rear part of the hanger.

6. An article of manufacture comprising a hanger constructed from a single piece consisting of an angular body having horizontal arms of different lengths at its upper portion, said arms having depending lugs, said body having elongated depending spaced parts, the lower portions of which extend toward each other and provided with terminals, thereby causing openings to be formed in the hanger to receive carrier supporting arms, and means for connecting the terminals of the depending parts together.

In testimony whereof I hereunto affix my signature.

LARS SKILBRED